US008569973B2

(12) United States Patent
Trovo'

(10) Patent No.: US 8,569,973 B2
(45) Date of Patent: Oct. 29, 2013

(54) POWER SUPPLY FOR LAMPS, PARTICULARLY FOR LED-MR16 LAMPS

(75) Inventor: Walter Trovo', Aosta (IT)

(73) Assignee: Dora S.p.A., Aosta (IT)

( * ) Notice: Subject to any disclaimer, the term of this patent is extended or adjusted under 35 U.S.C. 154(b) by 345 days.

(21) Appl. No.: 12/961,010

(22) Filed: Dec. 6, 2010

(65) Prior Publication Data

US 2011/0148325 A1 Jun. 23, 2011

(30) Foreign Application Priority Data

Dec. 23, 2009 (IT) .............................. MI2009A2279

(51) Int. Cl.
*G05F 1/00* (2006.01)

(52) U.S. Cl.
USPC ............ 315/307; 315/224; 315/247; 363/101

(58) Field of Classification Search
USPC .................. 315/185 S, 185 R, 307, 306, 224; 363/44, 101, 89
See application file for complete search history.

(56) References Cited

U.S. PATENT DOCUMENTS

2002/0140373 A1 10/2002 Ribarich et al.
2009/0200965 A1* 8/2009 King ............................ 315/307
2010/0207536 A1* 8/2010 Burdalski et al. ............ 315/224

FOREIGN PATENT DOCUMENTS

EP 0866546 A2 9/1998
EP 1381069 A2 1/2004
WO WO2009/055821 A1 * 4/2009 ............ H05B 37/00

OTHER PUBLICATIONS

Gerry Moschopoulos, and Praveen Jain, "Single-Phase Single-stage Power-Factor-Corrected Converter Topologies" Feb. 2005, IEEE Transactions on Industrial Electronics vol. 52, No. 1.*
All About Circuits, Webpublications, http://www.allaboutcircuits.com/worksheets/supply1.html, Nov. 6, 2008.*

* cited by examiner

*Primary Examiner* — Daniel Cavallari
*Assistant Examiner* — Srinivas Sathiraju
(74) *Attorney, Agent, or Firm* — Seed IP Law Group PLLC

(57) ABSTRACT

There is described a power supply for lamps, particularly for LED-MR16 lamps; the power supply receives an alternating voltage, particularly provided by an electronic transformer, at the input between first and second input terminals. The input alternating voltage has a high frequency component and the power supply comprises rectifier means of said input alternating voltage and at least one capacitor connected to the output of said rectifier means; the voltage at the ends of said capacitor is adapted to supply the lamp. The power supply includes a capacitive circuit arranged between the first and second terminals and adapted to be charged by the negative half-wave of the high frequency component of the input alternating voltage; the capacitive circuit adapted to discharge to the capacitor in the presence of the positive half-wave of the high frequency component of the input alternating voltage.

17 Claims, 4 Drawing Sheets

POWER SUPPLY FOR LAMPS, PARTICULARLY FOR LED-MR16 LAMPS

BACKGROUND

1. Technical Field

The present disclosure relates to a power supply for lamps, particularly for LED-MR16 lamps.

2. Description of the Related Art

The low voltage lamps, e.g., LED-MR16 (Multifaceted Reflector) lamps, are normally supplied with alternating current, typically a voltage of 12 VAC, for example, by means of traditional transformers or electronic transformers.

Halogen lamps represent a substantially resistive load for the electronic transformers, which have been designed to be cheap and compatible with classic phase slicing variators. The output signal of these transformers is basically a high frequency square wave, e.g., ranging between 30 kHz and 80 kHz, with a sinusoidal modulation in the envelope between 100 Hz and 120 Hz. Such a wave form is a consequence of the internal circuitry, essentially based on a self-oscillating circuit supplied by the rectified network.

The LED-MR16 lamps offer different advantages as compared to the traditional halogen lamps. These lamps should be able, where possible, to operate both in the presence of traditional transformers and in the presence of electronic transformers.

The LED-MR16 lamps often include an integrated switching circuit that, when supplied by a low-value rectified voltage signal, conveniently adjusts the current in the LEDs. FIG. 1 shows a block diagram of a typical circuit application for LED-MR16 lamps. The voltage signal Vtr from the electronic transformer is at the input of a diode bridge 1 adapted to rectify the voltage Vtr. The rectified voltage Vtr-ref is at the input of both the capacitor C and a switching DC-DC converter 2 supplying the LED-MR16 lamp 3. Therefore, the voltage signal from the transformer should be rectified and evened out so the integrated circuit of the lamp may use it. However, because low network frequencies are involved, typically 50 Hz or 60 Hz frequencies, a heavy filtering action on the pulsing component or ripple at 100 Hz-120 Hz of the voltage signal is required in order to avoid the voltage at the input of the integrated circuit from being lower than a minimum voltage threshold required for the correct operation thereof.

If the voltage at the input of the integrated circuit of the lamp is lower than the minimum threshold, however, the light on the LED lamp becomes flickering upon an excessive ripple on the input voltage due to the repeated switching-off; the so called "flickering" phenomenon occurs.

The electronic transformers, designed for a resistive load, show an even more penalizing behavior when used with LED-MR16 lamps.

Moreover, the presence of the capacitor C is the cause of an irregular operation of the electronic transformer leading to an even stronger pulsing component. FIG. 2 shows the voltage Vtr in FIG. 1 at the output of an electronic transformer and FIG. 3 shows the voltage Vtr-ref at the output of the diode bridge 1, where average value Avg=12.9V and ripple=6.9V.

BRIEF SUMMARY

In the view of the state of the art, the present disclosure provides a power supply for lamps, particularly for LED-MR16 lamps, that minimizes the flickering problem.

In accordance with the present disclosure, a power supply for lamps, particularly for LED-MR16 lamps, is provided. The power supply is structured to receive an alternating voltage, particularly provided by an electronic transformer, at the input between first and second input terminals, the input alternating voltage having a high frequency component. The power supply includes a rectifier circuit for the input alternating voltage and at least a capacitor connected to the output of the rectifier circuit. The voltage at the ends of the capacitor is used to supply the lamp. The power supply includes a capacitive element arranged between the first and the second terminals and structured to be charged by the negative half-wave of the high frequency component of the input alternating voltage. The capacitive element is also structured to discharge the capacitor in the presence of a positive half-wave of the high frequency component of the input alternating voltage.

In accordance with another aspect of the present disclosure, a circuit is provided that includes a rectifier circuit having first and second input terminals and first and second output terminals; a capacitive element having first and second terminals coupled to the first and second terminals of the rectifier circuit, respectively; and a rectification-booster circuit having first and second output terminals coupled to the first and second terminals of the capacitive element, the rectification-booster circuit structured to rectify a high-frequency alternating input voltage received on first and second inputs of the rectification-booster circuit and structured to output a discharge voltage onto the capacitive element to boost a voltage on the capacitive element above an output voltage received on the capacitive element from the rectifier circuit.

In accordance with another aspect of the present disclosure, the afore-mentioned rectification-booster circuit includes first and second series-coupled capacitors coupled across the first and second input terminals of the rectification-booster circuit and third and fourth series-coupled capacitors coupled across the first and second terminals of the capacitive element and having a common node between them, a first diode having a cathode coupled to the first terminal of the capacitive element and an anode coupled to a cathode of a second diode that has its anode coupled to the common node of the third and fourth capacitors, a third diode having a cathode coupled to the common node and an anode coupled to a cathode of a fourth diode that has an anode coupled to the second terminal of the capacitive element, the first capacitor having a first terminal coupled to a first alternating voltage terminal and to the first input of the rectifier circuit and a second terminal coupled to a first terminal of the second capacitor that has a second terminal coupled to a second alternating voltage terminal and to the second input of the rectifier circuit, the second terminal of the first capacitor coupled to the anode of the first diode, and the first terminal of the second capacitor coupled to the cathode of the fourth diode.

In accordance with another aspect of the present disclosure, a system is provided that includes a rectifier circuit having first and second input terminals and first and second output terminals; a capacitive element having first and second terminals coupled to the first and second terminals of the rectifier circuit, respectively; and a rectification-booster circuit comprising first and second series-coupled capacitors coupled across first and second input terminals of the rectification-booster circuit and third and fourth series-coupled capacitors coupled across the first and second terminals of the capacitive element and having a common node between them, a first diode having a cathode-coupled to the first terminal of the capacitive element and an anode coupled to a cathode of a second diode that has its anode coupled to the common node of the third and fourth capacitors, a third diode having a cathode coupled to the common node and an anode coupled to a cathode of a fourth diode that has an anode coupled to the second terminal of the capacitive element, the first capacitor having a first terminal coupled to a first alternating voltage terminal and to the first input of the rectifier circuit and a second terminal coupled to a first terminal of the second capacitor that has a second terminal coupled to a second alternating voltage terminal and to the second input of the rectifier circuit, the second terminal of the first capacitor coupled to the anode of the first diode, and the first terminal of the second capacitor coupled to the cathode of the fourth diode.

BRIEF DESCRIPTION OF THE SEVERAL VIEWS OF THE DRAWINGS

The features and advantages of the present disclosure will become apparent from the following detailed description of a practical embodiment thereof, shown by way of non-limiting example in the accompanying drawings, in which.

DETAILED DESCRIPTION

Figure 4:
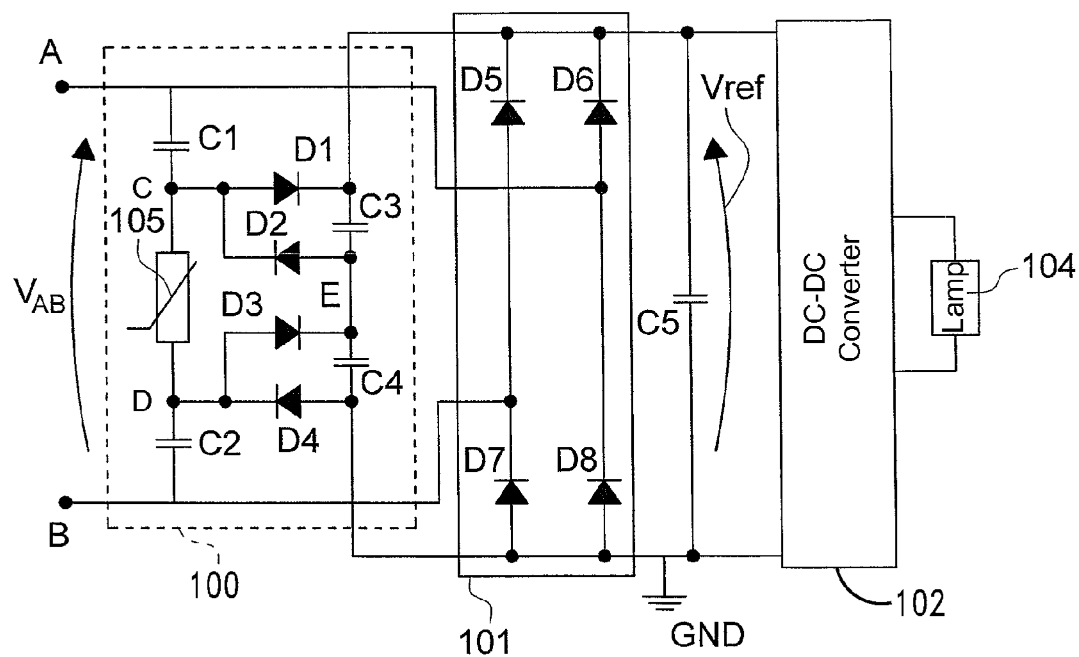
FIG. 4 is a diagram of a power supply for a LED-MR16 lamp in accordance with the present disclosure.

FIG. 4 shows a power supply for a lamp, preferably for an LED-MR16 lamp, in accordance with an embodiment of the present disclosure.

The power supply has at the input the alternating voltage Vab from a transformer (not shown), preferably an electronic transformer; the voltage Vab supplies a circuit 100 and voltage rectifier 101, e.g., a diode bridge D5-D6, and has a high frequency component Vripple, i.e., at a frequency ranging between 10 and 100 Khz. A capacitor C5 is arranged in parallel to the diode bridge 101 and connected to the output of the diode bridge 101, at the terminals of which there is the rectified voltage Vref. The voltage Vref is at the input of a DC-DC converter 102 adapted to supply a lamp 104, particularly an LED based lamp.

The diode bridge D5-D8 includes a pair of diodes D7 and D5 arranged in series, where the anode of diode D7 is connected to a terminal of capacitor C5 and to ground GND, the cathode of diode D5 is connected to the other terminal of capacitor C5, and the common terminal of diodes D5 and D7 is connected to the input terminal B. The diode bridge D5-D8 includes another pair of diodes D8 and D6 arranged in series, where the anode of diode D8 is connected to a terminal of capacitor C5 and to ground GND, the cathode of diode D6 is connected to the other terminal of capacitor C5, and the common terminal of diodes D6 and D8 is connected to the input terminal A.

This circuit 100 is substantially a rectifier-booster circuit exploiting the high frequency component Vripple of the voltage Vab. The circuit 100 includes capacitor C1 connected to the terminal A and having the other terminal C connected to the anode of diode D1 and to the cathode of diode D2; the cathode of diode D1 is connected to a first terminal of capacitor C3 having the second terminal connected to the anode of diode D2, indicated as the terminal E.

The terminal E is connected to the cathode of diode D3 and to a first terminal of capacitor C4 having the second terminal connected to the anode of diode D4; the anode of diode D3 is connected to the cathode of diode D4 and to the terminal D of a capacitor C2 having the other terminal connected to the terminal B.

Capacitors C3 and C4 form a capacitive divider. The common node has a potential that is half of the rectified voltage at the input of the lamp, i.e., Vref/2. Capacitors C3 and C4 preferably have a value ranging from 10 nF to 1 uF.

Capacitors C1 and C2 only provide the high frequency, alternating component Vripple with a path, while introducing a reactive drop. In the presence of a traditional transformer (50 Hz-60 Hz), such a circuit is actually idle and the rectifying action is carried out by the rectifier bridge 101. Capacitors C1 and C2 preferably have a value ranging from 10 nF to 1 uF.

In the presence of an electronic transformer, the circuit carries out the rectification of the high frequency, alternating component Vripple, while boosting the value of the voltage Vref at the input of lamp 104.

Indeed, in a high frequency half-cycle where the input terminals A and B have negative and positive potentials (with a peak value Vp), respectively. That is, in the presence of a negative half-wave of the high frequency component Vripple and with the capacitor C5 firstly charged to a voltage Vref=Vp, capacitors C1 and C2 charge, with the positive sign being in a downward direction, due to the path consisting of capacitor C2, diode D3, diode D2 and capacitor C1. The overall voltage is actually equal to Vref and each capacitor C1, C2 will charge to the voltage Vref/2.

At the next high frequency half-cycle, i.e., in the presence of the positive half-wave of the high frequency component Vripple, the terminal polarity inverts and the two capacitors discharge onto the capacitor C5, thus boosting the voltage Vref on the same capacitor C5. The reactive drop on the capacitors C1 and C2 actually limits the current tending to boost the voltage Vref, thus causing the voltage on the capacitor C5 to be higher than the peak value Vp of the input but within a secure value for the integrated circuit placed downstream of the capacitor C5. In particular, capacitor C1 will discharge on the capacitor C5 by means of the diode D1, while the capacitor C2 will discharge on the capacitor C5 by means of the diode D5 of the diode bridge 101.

Figure 1:
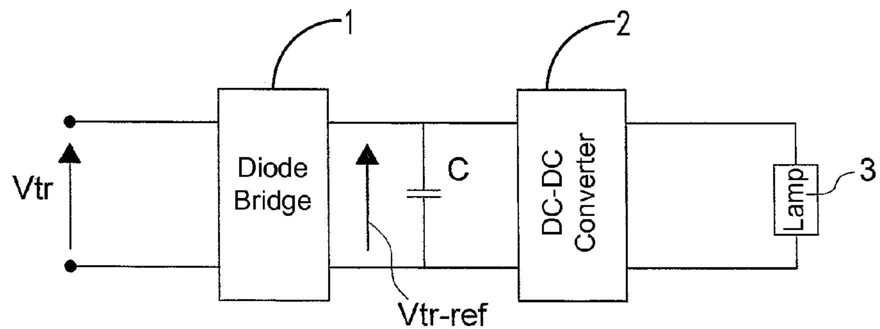
FIG. 1 is a block diagram of a power supply for a halogen lamp in accordance with the known art.
Figure 5:
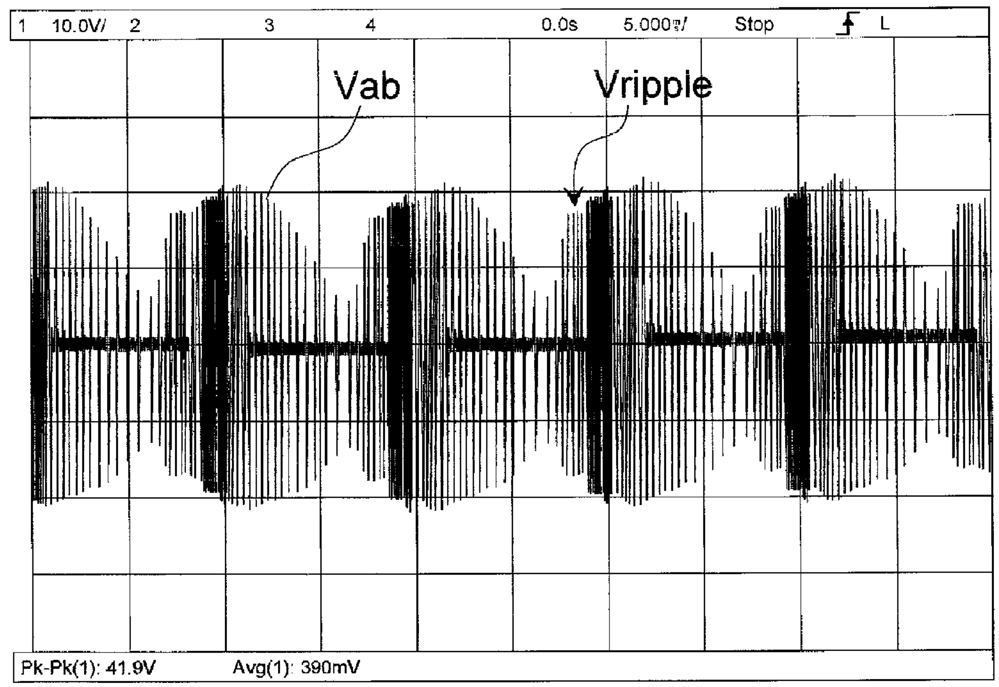
FIG. 5 shows the time chart of the wave form of the voltage at the input of the power supply in FIG. 4.

The boost effect of the network also has the advantage of strongly charging the electronic transformer at the beginning of every half-cycle of the network, significantly improving its behavior with LED lamps. FIG. 5 shows the voltage Vab of the circuit in FIG. 4. It is noted that voltage Vab has a higher concentration at the beginning of a half-cycle of the network than the voltage Vtr in FIG. 1.

Figure 2:
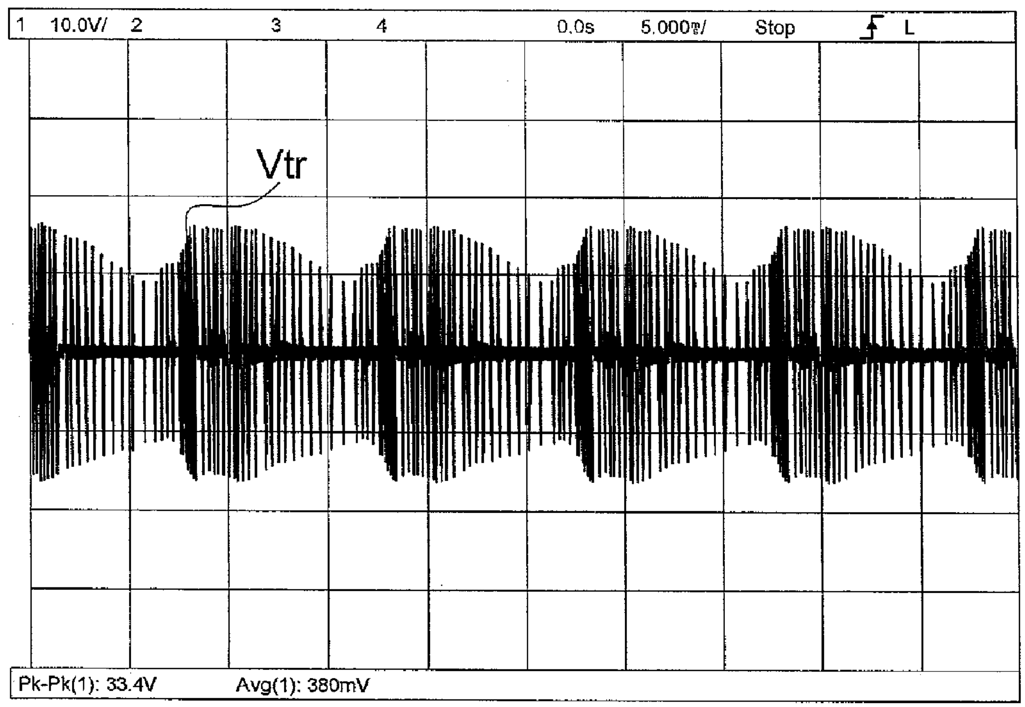
FIG. 2 shows the time chart of the wave form of the voltage at the input of the power supply in FIG. 1.
Figure 3:
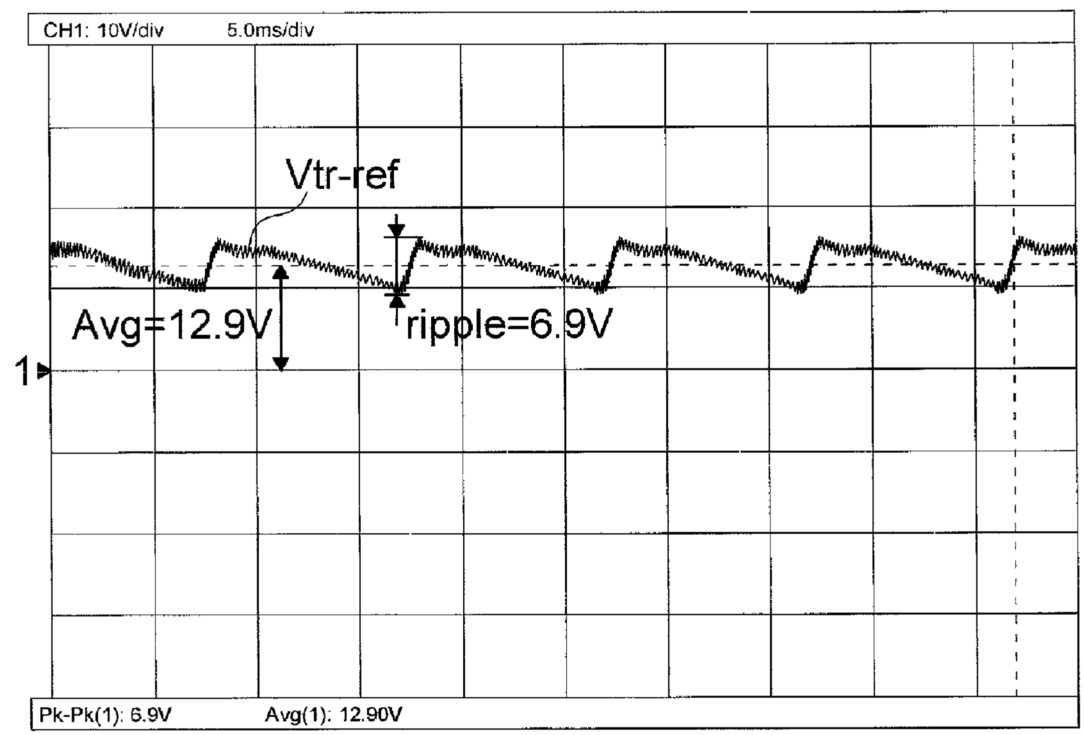
FIG. 3 shows the time chart of the wave form of the voltage rectified by a diode bridge of the power supply in FIG. 1.
Figure 6:
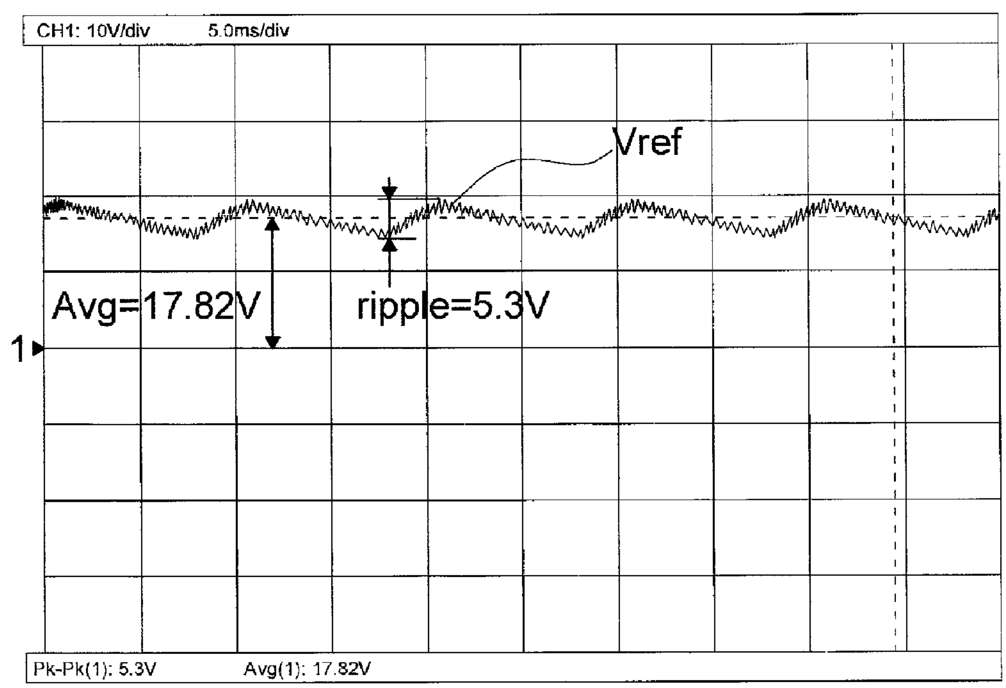
FIG. 6 shows the time chart of the wave form of the voltage rectified by a diode bridge of the power supply in FIG. 4.

The voltage Vref, shown in FIG. 6, shows an absence of flickering as compared to the voltage Vtr-ref in FIG. 2; in the illustrated example, average value Avg=17.82V and ripple=5.3V which is lower than the ripple of the voltage Vtr-ref in FIG. 3.

The boost of the average value of voltage Vab at the input makes a higher low-frequency residual ripple acceptable, which translates into the possibility of using a smaller value for the filtering capacitor C5 under the same conditions.

As a variation of the embodiment of the present disclosure, a thermistor PTC 105 may be inserted in circuit 100, particularly between the terminals C and D of the capacitors C1 and C2. The object of the thermistor 105 is to provide the electronic transformer with a minimum resistive load when the low frequency envelope decreases. For this reason, the presence of the thermistor 105 improves the behavior of the electronic transformer. Due to its own nature, the thermistor PTC 105 achieves a self-adjusting load (a useful function with electronic transformers having a significantly different peak voltage).

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A circuit, comprising:

a rectifier circuit having first and second input terminals and first and second output terminals and configured to provide an output voltage;

a capacitive element having first and second terminals coupled to the first and second output terminals of the rectifier circuit, respectively, wherein the capacitive element is configured to receive the output voltage from the rectifier circuit; and a rectification-booster circuit that includes;

first and second input terminals configured to receive an alternating input voltage and first and second output terminals coupled to the first and second terminals of the capacitive element, the rectification-booster circuit structured to rectify a high-frequency component of the alternating input voltage and to output a discharge voltage onto the capacitive element to boost a voltage on the capacitive element above the output voltage;

a diode circuit having first and second input terminals, and first and second output terminals coupled to the first and second output terminals of the rectification-booster circuit;

a first capacitor having a first terminal coupled to the first input terminal of the rectification-booster circuit and a second terminal coupled to the first input terminal of the diode circuit;

a second capacitor having a first terminal coupled to the second input terminal of the diode circuit and a second terminal coupled to the second input terminal of the rectification-booster circuit;

a third capacitor having a first terminal coupled to the first output terminal of the diode circuit and a second terminal coupled to a common node; and a fourth capacitor having a first terminal coupled to the second output terminal of the rectification-booster circuit and a second terminal coupled to the common node.

2. The circuit of claim 1, wherein the diode circuit includes a first diode having a cathode coupled to the first terminal of the capacitive element and an anode coupled to a cathode of a second diode that has its anode coupled to the common node, a third diode having a cathode coupled to the common node and an anode coupled to a cathode of a fourth diode that has an anode coupled to the second terminal of the capacitive element, the first capacitor having the first terminal coupled to a first alternating voltage terminal and to the first input of the rectifier circuit and the second capacitor having the second terminal coupled to a second alternating voltage terminal and to the second input of the rectifier circuit.

3. The circuit of claim 1, comprising a thermistor coupled between the second terminal of the first capacitor and the first terminal of the second capacitor.

4. The circuit of claim 2, comprising a DC-DC converter circuit coupled to the first and second terminals of the capacitive element and having first and second output terminals coupled to first and second terminals of a light source.

5. The circuit of claim 4, wherein the light source comprises an LED.

6. The circuit of claim 4, comprising a transformer having first and second output terminals coupled to the first and second alternating voltage terminals, respectively, of the rectification-booster circuit.

7. A system, comprising:

a rectifier circuit having first and second input terminals and first and second output terminals;

a capacitive element having first and second terminals coupled to the first and second output terminals of the rectifier circuit, respectively; and a rectification-booster circuit that includes:

first and second input terminals, and first and second output terminals coupled to the first and second terminals of the capacitive element;

a first capacitor having a first terminal coupled to the first input terminal of the rectification-booster circuit and coupled to the first input terminal of the rectifier circuit, the first capacitor further having a second terminal;

a second capacitor having a first terminal, and having a second terminal coupled to the second input terminal of the rectification-booster circuit;

a third and fourth series-coupled capacitors coupled across the first and second terminals of the capacitive element and having a common node between them;

a first diode having a cathode-coupled to the first terminal of the capacitive element and an anode coupled to the second terminal of the first capacitor;

a second diode having a cathode coupled to the anode of the first diode and an anode coupled to the common node of the third and fourth capacitors;

a third diode having a cathode coupled to the common node and an anode coupled to the first terminal of the second capacitor; and a fourth diode having a cathode coupled to the anode of the third diode and an anode coupled to the second terminal of the capacitive element.

8. The system of claim 7, wherein the rectification-booster circuit is structured to rectify a high-frequency alternating input voltage received on the first and second input terminals of the rectification-booster circuit and further structured to output a discharge voltage onto the capacitive element to boost a voltage on the capacitive element above an output voltage received on the capacitive element from the rectifier circuit.

9. The system of claim 7, comprising a thermistor coupled between the second terminal of the first capacitor and the first terminal of the second capacitor.

10. The system of claim 7, comprising a DC-DC converter circuit coupled to the first and second terminals of the capacitive element and having first and second output terminals coupled to first and second terminals of a light source.

11. The system of claim 10, wherein the light source comprises an LED.

12. The system of claim 10, comprising a transformer having first and second output terminals coupled to the first and second input terminals of the rectification-booster circuit, respectively.

13. A power supply, comprising:

a capacitive element having first and second terminals;

a rectifier circuit having first and second input terminals configured to receive as input an alternating voltage, and first and second output terminals coupled to the first and second terminals, respectively, of the capacitive element, the rectifier circuit structured to provide a supply voltage to the capacitive element;

a rectification-booster circuit that includes:

first and second input terminals coupled to the first and second input terminals of the rectifier circuit;

a diode circuit having first and second input terminals and first and second output terminals; and a capacitive circuit arranged between the first and the second input terminals of the rectification-booster circuit and configured to be charged by a negative half-wave of the high frequency component of the alternating voltage and further configured to discharge to the capacitive element in the presence of a positive half-wave of the high frequency component of the alternating voltage, the capacitive circuit including:

a first capacitor having a first terminal coupled to the first input terminal of the rectification-booster circuit and a second terminal coupled to the first input terminal of the diode circuit;

a second capacitor having a first terminal coupled to the second input terminal of the diode circuit and a second terminal coupled to the second input terminal of the rectification-booster circuit;

a third capacitor having a first terminal coupled to the first output terminal of the diode circuit and a second terminal coupled to a common node; and a fourth capacitor having a first terminal coupled to the second output terminal of the rectification circuit and a second terminal coupled to the common node.

14. The power supply according to claim 13, wherein the diode circuit is configured to allow only one current path through the first and second capacitors from the second input terminal to the first input terminal.

15. The power supply according to claim 14, wherein the third and fourth capacitors are arranged in series via the common node at the first and second output terminals of the rectifier circuit, the third and fourth capacitors are configured to have a value such that the common node will have a voltage substantially equal to half of a rectified voltage from the rectifier, the diode circuit including first and second diodes that have a common terminal that coincides with the common node of the third and fourth capacitors.

16. The power supply according to claim 14, comprising a thermistor coupled between the first and the second capacitors.

17. The power supply according to claim 14, wherein the first and second capacitors each have a value ranging from 10 nF to 1 uF.

* * * * *